United States Patent
Adachi

(10) Patent No.: US 8,397,260 B2
(45) Date of Patent: Mar. 12, 2013

(54) DISPLAY AND METHOD OF CONTROLLING DISPLAY

(75) Inventor: Takafumi Adachi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 307 days.

(21) Appl. No.: 12/721,871

(22) Filed: Mar. 11, 2010

(65) Prior Publication Data

US 2010/0235862 A1 Sep. 16, 2010

(30) Foreign Application Priority Data

Mar. 12, 2009 (JP) .................................. 2009-59785

(51) Int. Cl.
*H04N 5/445* (2011.01)
*G06F 3/00* (2006.01)
*G06F 13/00* (2006.01)

(52) U.S. Cl. ................ 725/43; 725/44; 725/45; 725/46; 725/47; 725/48; 725/49; 725/50; 725/52; 725/59; 725/61; 348/563; 348/564; 348/565; 348/588

(58) Field of Classification Search .............. 725/43–50, 725/52, 59, 61; 348/563–565, 588
See application file for complete search history.

(56) References Cited

U.S. PATENT DOCUMENTS

| | | | | |
|---|---|---|---|---|
| 6,449,018 B1* | 9/2002 | Yokoyama | .................... | 348/565 |
| 7,456,907 B2* | 11/2008 | Liebhold | ........................ | 348/734 |
| 7,990,473 B2* | 8/2011 | Fujiwara et al. | ............. | 348/565 |
| 2003/0233653 A1* | 12/2003 | Hwang et al. | .................... | 725/38 |
| 2004/0250292 A1* | 12/2004 | Okamoto et al. | ............. | 725/131 |
| 2006/0150231 A1* | 7/2006 | Kim et al. | ..................... | 725/118 |
| 2008/0303960 A1 | 12/2008 | Shioji | | |

FOREIGN PATENT DOCUMENTS

| | | |
|---|---|---|
| JP | 2000-138873 A | 5/2000 |
| JP | 2001-346109 A | 12/2001 |
| JP | 2006-33253 A | 2/2006 |
| JP | 2008-154149 A | 7/2008 |
| JP | 2008-306629 A | 12/2008 |

OTHER PUBLICATIONS

Japanese Office Action dated Dec. 14, 2010 with English translation (five (5) pages).
Japanese Office Action dated Mar. 15, 2011 with English translation (four (4) pages).

* cited by examiner

*Primary Examiner* — Jason Salce

(74) *Attorney, Agent, or Firm* — Crowell & Moring LLP

(57) ABSTRACT

This display includes a control portion controlling a selected screen portion to display a program other than a program displayed on a nonselected screen portion if a program subsequently displayed on the selected screen portion and the program displayed on the nonselected screen portion are identical to each other.

9 Claims, 12 Drawing Sheets

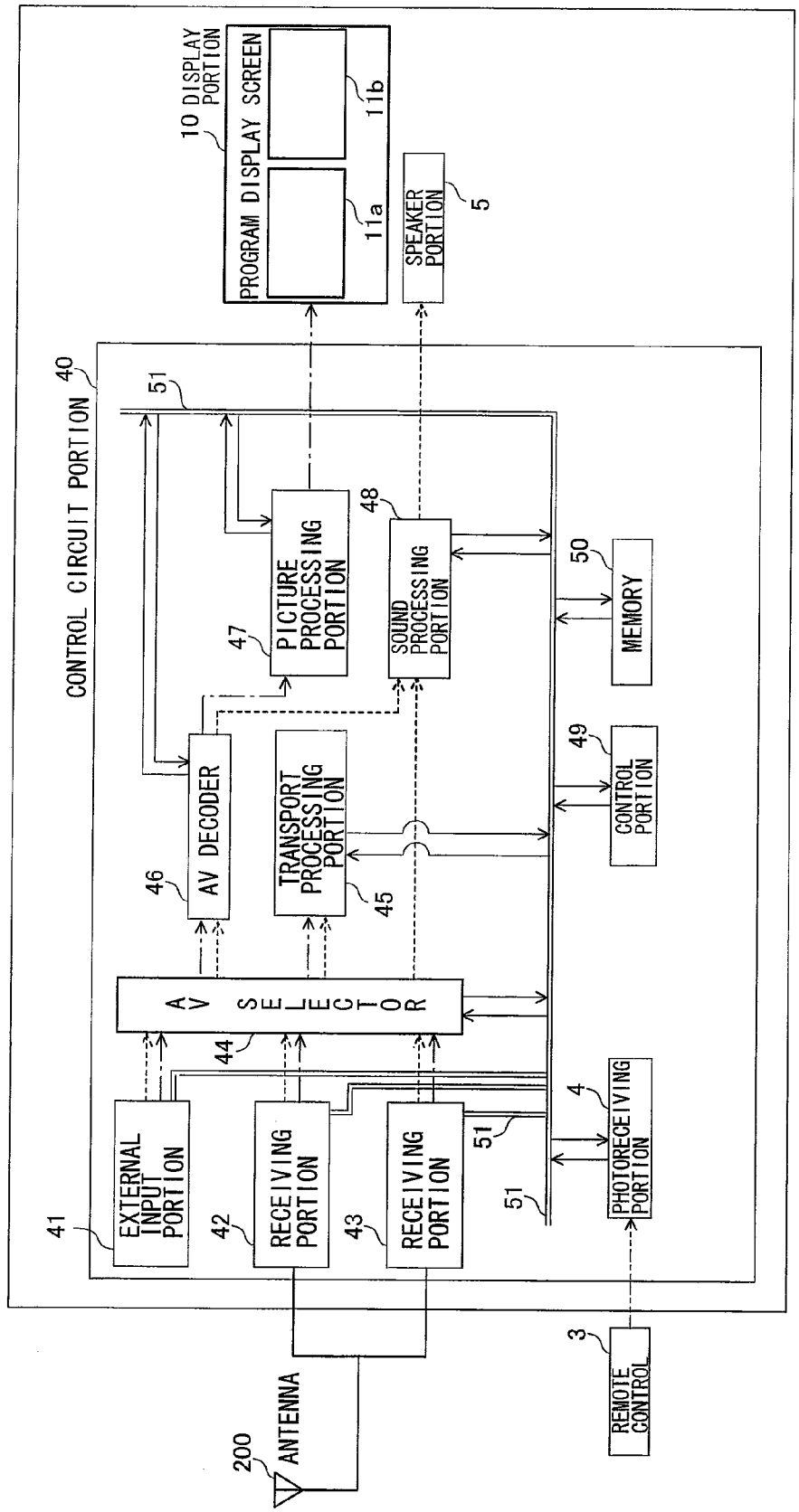

FIG.5

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_length | 8 | uimsbf |
|     last_section_number | 8 | uimsbf |
|     reserved | 3 | bslbf |
|     PCR_PID | 13 | uimsbf |
|     reserved | 4 | bslbf |
|     for(i=0; i<N; i++) { | 12 | uimsbf |
|         descriptor() | | |
|     } | | |
|     for(i=0; i<N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0; i<N2; i++) { | | |
|             descriptor() | | |
|         } | | |
|     } | 32 | rpchof |
|     CRC_32 | | |

| Syntax | No. of Bits | Format |
|---|---|---|
| terrestrial_virtual_channel_table_section () { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_section; i++) { | | |
|         short_name | 7*16 | unicode |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0;i<N;i++) { | | |
|             descriptor() | | |
|         } | | |
|     } | | |
|     reserved | 6 | '111111' |
|     additional_descriptors_length | 10 | uimsbf |
|     for(j=0; j<N; j++) { | | |
|         additional_descriptor() | | |
|     } | | |
|     CRC_32 | 32 | rpchof |
| } | | |

FIG.7

| Syntax | No. of Bits | Format |
|---|---|---|
| cable_virtual_channel_table_section () { | | |
|     table_id | 8 | 0xC9 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_section; i++) { | | |
|         short_name | 7*16 | unicode |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         path_select | 1 | bslbf |
|         out_of_band | 1 | bslbf |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0;i<N;i++) { | | |
|             descriptor() | | |
|         } | | |
|     } | | |
|     reserved | 6 | '111111' |
|     additional_descriptors_length | 10 | uimsbf |
|     for(j=0; j<N;j++) { | | |
|         additional_descriptor() | | |
|     } | | |
|     CRC_32 | 32 | rpchof |
| } | | |

FIG.8    OPERATION FLOW IN PROGRAM SELECTION
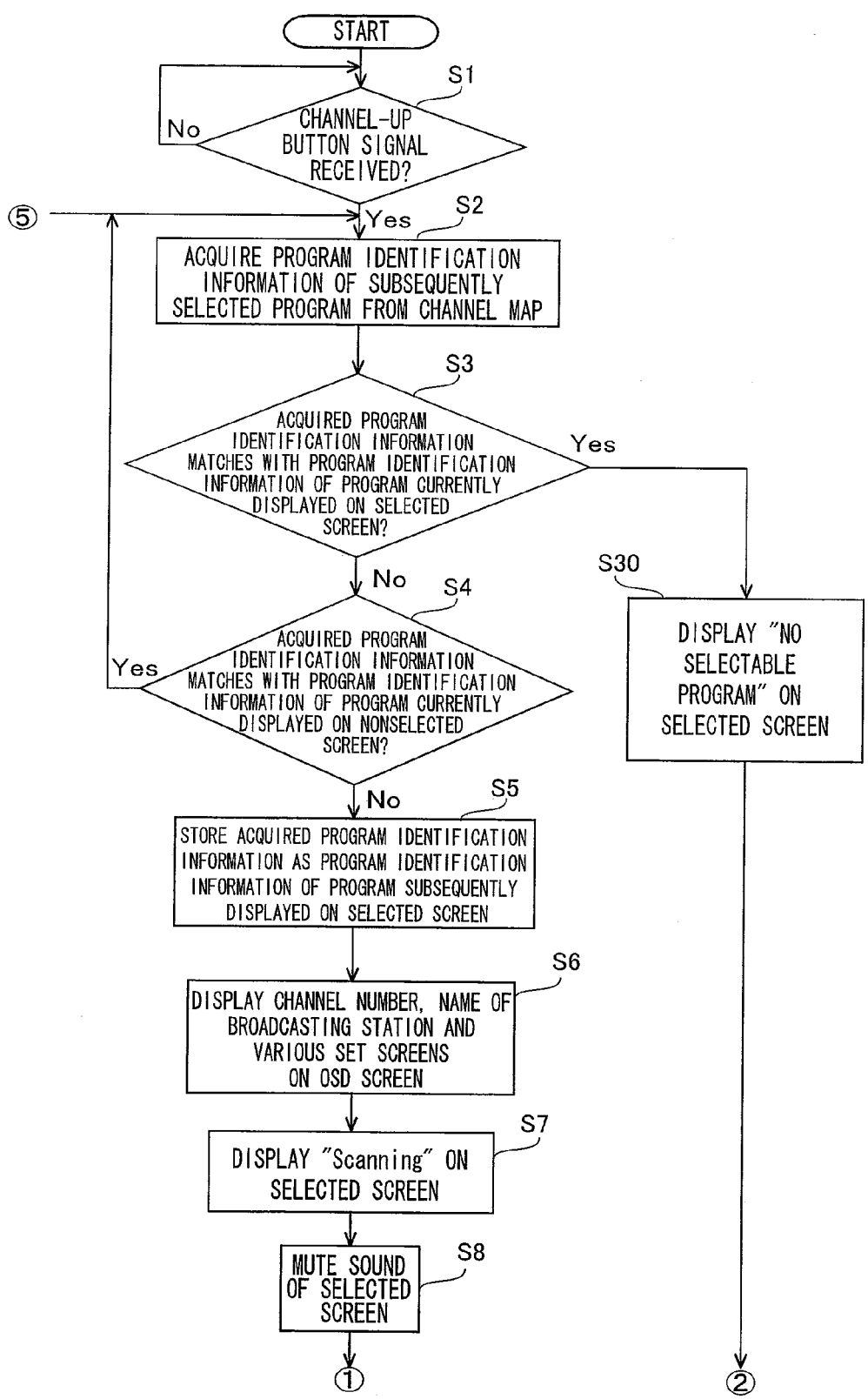

DISPLAY AND METHOD OF CONTROLLING DISPLAY

BACKGROUND OF THE INVENTION

1. Field of the Invention

The present invention relates to a display and a method of controlling a display, and more particularly, it relates to a display comprising two display screen portions provided to be capable of displaying programs thereon independently of each other and a method of controlling the display.

2. Description of the Background Art

A display including two display screen portions provided to be capable of displaying programs thereon independently of each other is known in general. The two display screen portions of the display are formed to be capable of switching programs displayed thereon by operations of the user respectively, so that the user selects either one of the two display screen portions as a selected screen portion. The user switches the program displayed on the selected screen portion.

On the other hand, a television (display) selecting a program displayed on a display portion having one screen is known in general. For example, Japanese Patent Laying-Open Nos. 2008-306629, 2008-154149 and 2001-346109 disclose such televisions.

The aforementioned Japanese Patent Laying-Open No. 2008-306629 discloses a television (display) comprising a microcomputer. When receiving a plurality of physical channels with respect to the same program, the microcomputer controls the television not to select physical channels excluding one physical channel among the plurality of physical channels corresponding to the program. The aforementioned Japanese Patent Laying-Open No. 2008-154149 discloses a television (display) comprising a processing portion. When creating a channel database corresponding to digital television broadcasting according to ATSC standards, the processing portion so stores channel information in the database that data of the channel information are not overlappingly registered. The aforementioned Japanese Patent Laying-Open No. 2001-346109 discloses a television capable of increasing the speed of channel selection processing on the basis of a channel number of a program included in a radio wave of television broadcasting by predicting a picture identifier and a sound identifier belonging to the program.

If a display portion of the television (display) having one display screen portion according to the aforementioned Japanese Patent Laying-Open No. 2008-306629 is so formed as to have two display screen portions, however, the two display screen portions may disadvantageously simultaneously display the same program when one physical channel is selected for the respective ones of the two display screen portions at the same time.

If a display portion of the television (display) having one display screen portion according to the aforementioned Japanese Patent Laying-Open No. 2008-154149 is so formed as to have two display screen portions, the two display screen portions may disadvantageously simultaneously display the same channel (program) on the basis of the channel information stored in the channel database when the same channel is selected for the two display screen portions.

If a display portion of the television (display) having one display screen portion according to the aforementioned Japanese Patent Laying-Open No. 2001-346109 is so formed as to have two display screen portions, the two display screen portions may disadvantageously simultaneously display the same program when the user selects the same channel number for the two display screen portions.

SUMMARY OF THE INVENTION

The present invention has been proposed in order to solve the aforementioned problems, and an object of the present invention is to provide a display and a method of controlling a display each capable of suppressing simultaneous display of the same program on two display screen portions.

A display according to a first aspect of the present invention comprises a display portion including a first display screen portion capable of switching a program displayed thereon by an operation of the user and a second display screen portion provided to be capable of displaying a program thereon independently of the first display screen portion and capable of switching a program displayed thereon by an operation of the user and a control portion controlling, when the user performs an operation of selecting either the first display screen portion or the second display screen portion as a selected screen portion and switching a program, the selected screen portion to display a program other than a program displayed on a nonselected screen portion corresponding to the nonselected one of the first and second display screen portions if a program subsequently displayed on the selected screen portion and the program displayed on the nonselected screen portion are identical to each other.

In the display according to the first aspect of the present invention, as hereinabove described, the display portion including the first display screen portion capable of switching the program displayed thereon by the operation of the user and the second display screen portion capable of switching the program displayed thereon by the operation of the user independently of the first display screen portion is provided and the control portion is so formed as to control the selected screen portion to display the program other than the program displayed on the nonselected screen portion corresponding to the nonselected one of the first and second display screen portions when the user performs the operation of selecting either the first display screen portion or the second display screen portion as the selected screen and switching the program if the program subsequently displayed on the selected screen portion and the program displayed on the nonselected screen portion are identical to each other, whereby the selected screen portion corresponding to either the first display screen portion or the second display screen portion and the nonselected screen portion corresponding to the nonselected one of the first and second display screen portions do not simultaneously display pictures of the same program. Thus, the two display screen portions, i.e., the first display screen portion and the second display screen portion provided to be capable of displaying a program thereon independently of the first display screen portion can be inhibited from simultaneously displaying the same program.

In the aforementioned display according to the first aspect, the control portion is preferably so formed as to determine whether or not the program subsequently displayed on the selected screen portion and the program currently displayed on the nonselected screen portion are identical to each other by comparing program identification information related to the program currently displayed on the nonselected screen portion and program identification information related to the program subsequently displayed on the selected screen portion with each other when the user performs an operation of switching the program displayed on the selected screen portion and to control the selected screen portion to display the program other than the program displayed on the nonselected screen portion if the programs are identical to each other. According to this structure, the control portion can easily determine whether or not the program subsequently displayed on the selected screen portion and the program currently displayed on the nonselected screen portion are identical to each other with the program identification information related to the program currently displayed on the nonselected screen portion of the display portion and the program identification information related to the program subsequently displayed on the selected screen portion. Thus, the display can be easily so formed that the selected screen portion and the nonselected screen portion do not simultaneously display pictures of the same program.

In this case, the display preferably further comprises a storage portion capable of storing the program identification information related to the program subsequently displayed on the selected screen portion of the display portion and the program identification information related to the program currently displayed on the nonselected screen portion. According to this structure, the control portion can more easily determine whether or not the program subsequently displayed on the selected screen portion and the program currently displayed on the nonselected screen portion are identical to each other with the program identification information stored in the storage portion.

In the aforementioned display comparing the program identification information, the control portion is preferably so formed as to acquire the program identification information related to the program currently displayed on the nonselected screen portion and the program identification information related to the program subsequently displayed on the selected screen portion from a channel map including the program identification information and to compare the same with each other when the user performs the operation of switching the program displayed on the selected screen portion. According to this structure, the control portion can easily compare the program identification information by acquiring the program identification information from the channel map.

In this case, the control portion is preferably so formed as to update the channel map on the basis of the program identification information related to the program subsequently displayed on the selected screen portion if the program subsequently displayed on the selected screen portion is a program of digital television broadcasting. According to this structure, the control portion can compare the program identification information in a state acquiring more recent program identification information from the channel map by updating the channel map.

The aforementioned display comparing the program identification information preferably further comprises a receiving portion receiving a picture of a program distributed by a broadcasting station and displayed on the display portion, the receiving portion is preferably so formed as to receive the program identification information from the broadcasting station along with picture information of the program, and the control portion is preferably so formed as to determine whether or not the program subsequently displayed on the selected screen portion and the program currently displayed on the nonselected screen portion are identical to each other by comparing the program identification information received by the receiving portion. According to this structure, the control portion can easily determine whether or not the program subsequently displayed on the selected screen portion and the program currently displayed on the nonselected screen portion are identical to each other with the program identification information acquired by the receiving portion and control the selected screen portion to display the program other than the program displayed on the nonselected screen portion if the programs are identical to each other.

In the aforementioned display comprising the receiving portion receiving the program identification information distributed by the broadcasting station, the program identification information preferably includes channel numbers corresponding to a program of digital television broadcasting and a program of analog television broadcasting distributed by the broadcasting station and received by the receiving portion, and the control portion is preferably so formed as to determine whether or not the program subsequently displayed on the selected screen portion and the program currently displayed on the nonselected screen portion are identical to each other by comparing the channel number of the program currently displayed on the nonselected screen portion and the channel number of the program subsequently displayed on the selected screen portion with each other and to control the selected screen portion to display the program other than the program displayed on the nonselected screen portion if the programs are identical to each other. According to this structure, the control portion can easily determine whether or not the program subsequently displayed on the selected screen portion and the program currently displayed on the nonselected screen portion are identical to each other with the channel numbers distributed by the broadcasting station with the program of digital television broadcasting and the program of analog television broadcasting, whereby the selected screen portion and the nonselected screen portion can be more easily controlled not to simultaneously display pictures of the same program.

In this case, the program distributed by the broadcasting station and received by the receiving portion is preferably the program of digital television broadcasting, each channel number preferably has a virtual channel number corresponding to a plurality of programs and a subchannel number corresponding to any one of the plurality of programs corresponding to the virtual channel number, and the control portion is preferably so formed as to compare the virtual channel number and the subchannel number of the program currently displayed on the nonselected screen portion and the virtual channel number and the subchannel number of the program subsequently displayed on the selected screen portion with each other when the user performs the operation of switching the program displayed on the selected screen portion. According to this structure, the control portion can more reliably determine whether or not the program subsequently displayed on the selected screen portion and the program currently displayed on the nonselected screen portion are identical to each other by comparing both of the virtual channel number and the subchannel number corresponding to any one of the plurality of programs corresponding to the virtual channel number even if the virtual channel number corresponds to the plurality of programs.

In the aforementioned display comparing the channel numbers with each other, the control portion is preferably so formed as to display a program of a channel number subsequent to the channel number of the program displayed on the nonselected screen portion on the selected screen portion if the channel number of the program subsequently displayed on the selected screen portion and the channel number of the program currently displayed on the nonselected screen portion are identical to each other when the user successively switches programs displayed on the selected screen portion in the order of the channel numbers. According to this structure, the control portion can easily control the selected screen portion to display a program different from the program currently displayed on the nonselected screen portion.

In the aforementioned display comparing the program identification information, the program identification information preferably includes a program identifier and a picture identifier corresponding to a program of digital television broadcasting, and the control portion is preferably so formed as to determine whether or not the program subsequently displayed on the selected screen portion and the program currently displayed on the nonselected screen portion are identical to each other by comparing at least either the program identifier or the picture identifier of the program currently displayed on the nonselected screen portion and at least either the program identifier or the picture identifier of the program subsequently displayed on the selected screen portion with each other and to control the selected screen portion to display the program other than the program displayed on the nonselected screen portion if the programs are identical to each other when the nonselected screen portion displays the program of digital television broadcasting and the program subsequently displayed on the selected screen portion is the program of digital television broadcasting. According to this structure, the control portion can reliably determine whether or not the program subsequently displayed on the selected screen portion and the program currently displayed on the nonselected screen portion are identical to each other with at least either the program identifier or the picture identifier included in the program identification information corresponding to the program of digital television broadcasting, whereby the selected screen portion and the nonselected screen portion can be reliably controlled not to simultaneously display pictures of the same program.

In this case, the control portion is preferably so formed as to compare the picture identifier of the program currently displayed on the nonselected screen portion and the picture identifier of the program subsequently displayed on the selected screen portion with each other if the program identifiers are invalid. According to this structure, the control portion can reliably determine whether or not the program subsequently displayed on the selected screen portion and the program currently displayed on the nonselected screen portion are identical to each other with the picture identifiers, even if the program identifiers are invalid.

A method of controlling a display according to a second aspect of the present invention is a method of controlling a display in which the user selects either a first display screen portion of a display portion or a second display screen portion provided to be capable of displaying a program thereon independently of the first display screen portion as a selected screen portion and switches a program, comprising the steps of determining whether or not a program subsequently displayed on the selected screen portion and a program displayed on a nonselected screen portion corresponding to the nonselected one of the first and second display screen portions are identical to each other, and displaying a program other than the program displayed on the nonselected screen portion on the selected screen portion if the program subsequently displayed on the selected screen portion and the program displayed on the nonselected screen portion are identical to each other.

In the method of controlling a display according to the second aspect of the present invention, as hereinabove described, the program other than the program displayed on the nonselected screen portion is displayed on the selected screen portion if the program subsequently displayed on the selected screen portion and the program displayed on the nonselected screen portion are identical to each other, whereby the selected screen portion corresponding to either the first display screen portion or the second display screen portion and the nonselected screen portion corresponding to the nonselected one of the first and second display screen portions do not simultaneously display pictures of the same program. Thus, the two display screen portions, i.e., the first display screen portion and the second display screen portion provided to be capable of displaying a program thereon independently of the first display screen portion can be inhibited from simultaneously displaying the same program.

In the aforementioned method of controlling a display according to the second aspect, the step of determining whether or not the programs are identical to each other preferably includes a step of determining whether or not the program subsequently displayed on the selected screen portion and the program currently displayed on the nonselected screen portion are identical to each other by comparing program identification information related to the program currently displayed on the nonselected screen portion and program identification information related to the program subsequently displayed on the selected screen portion with each other. According to this structure, whether or not the program subsequently displayed on the selected screen portion and the program currently displayed on the nonselected screen portion are identical to each other can be easily determined with the program identification information related to the program currently displayed on the nonselected screen portion of the display portion and the program identification information related to the program subsequently displayed on the selected screen portion.

In this case, the step of determining whether or not the programs are identical to each other preferably further includes a step of acquiring the program identification information related to the program currently displayed on the nonselected screen portion and the program identification information related to the program subsequently displayed on the selected screen portion from a channel map including the program identification information and comparing the same with each other. According to this structure, the program identification information is so acquired from the channel map that the program identification information can be easily compared.

In the aforementioned method of controlling a display including the step of acquiring the program identification information from the channel map, the step of determining whether or not the programs are identical to each other preferably further includes a step of updating the channel map on the basis of the program identification information related to the program subsequently displayed on the selected screen portion if the program subsequently displayed on the selected screen portion is a program of digital television broadcasting. According to this structure, the channel map is so updated that more recent program identification information can be acquired from the channel map to be compared.

In the aforementioned method of controlling a display by comparing the program identification information, the display preferably includes a receiving portion receiving a picture of a program distributed by a broadcasting station and displayed on the display portion, and the step of determining whether or not the programs are identical to each other preferably further includes a step of comparing the program identification information received by the receiving portion from the broadcasting station along with picture information of the program. According to this structure, whether or not the program subsequently displayed on the selected screen portion and the program currently displayed on the nonselected screen portion are identical to each other can be easily determined with the program identification information acquired by the receiving portion.

In this case, the program identification information preferably includes channel numbers corresponding to a program of digital television broadcasting and a program of analog television broadcasting distributed by the broadcasting station and received by the receiving portion, and the step of determining whether or not the programs are identical to each other preferably further includes a step of comparing the channel number of the program currently displayed on the nonselected screen portion and the channel number of the program subsequently displayed on the selected screen portion with each other. According to this structure, whether or not the program subsequently displayed on the selected screen portion and the program currently displayed on the nonselected screen portion are identical to each other can be easily determined with the channel numbers distributed by the broadcasting station with the program of digital television broadcasting and the program of analog television broadcasting.

In the aforementioned method of controlling a display including the step of comparing the channel numbers, the program distributed by the broadcasting station and received by the receiving portion is preferably the program of digital television broadcasting, each channel number preferably has a virtual channel number corresponding to a plurality of programs and a subchannel number corresponding to any one of the plurality of programs corresponding to the virtual channel number, and the step of determining whether or not the programs are identical to each other preferably further includes a step of comparing the virtual channel number and the subchannel number of the program currently displayed on the nonselected screen portion and the virtual channel number and the subchannel number of the program subsequently displayed on the selected screen portion with each other. According to this structure, whether or not the program subsequently displayed on the selected screen portion and the program currently displayed on the nonselected screen portion are identical to each other can be more reliably determined by comparing both of the virtual channel number and the subchannel number corresponding to any one of the plurality of programs corresponding to the virtual channel number even if the virtual channel number corresponds to the plurality of programs.

In the aforementioned method of controlling a display including the step of comparing the channel numbers, the step of displaying the program other than the program displayed on the nonselected screen portion on the selected screen portion preferably includes a step of displaying a program of a channel number subsequent to the channel number of the program displayed on the nonselected screen portion on the selected screen portion if programs displayed on the selected screen portion are successively switched in the order of the channel numbers and the program subsequently displayed on the selected screen portion and the program displayed on the nonselected screen portion are identical to each other. According to this structure, the selected screen portion can be easily controlled to display a program different from the program currently displayed on the nonselected screen portion.

In the aforementioned method of controlling a display by comparing the program identification information, the program identification information preferably includes a program identifier and a picture identifier corresponding to a program of digital television broadcasting, and the step of determining whether or not the programs are identical to each other preferably further includes a step of comparing at least either the program identifier or the picture identifier of the program currently displayed on the nonselected screen portion and at least either the program identifier or the picture identifier of the program subsequently displayed on the selected screen portion with each other if the nonselected screen portion displays the program of digital television broadcasting and the program subsequently displayed on the selected screen portion is the program of digital television broadcasting. According to this structure, whether or not the program subsequently displayed on the selected screen portion and the program currently displayed on the nonselected screen portion are identical to each other can be reliably determined with at least either the program identifier or the picture identifier included in the program identification information corresponding to the program of digital television broadcasting.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram for illustrating a control circuit portion of the liquid crystal television according to the embodiment shown in FIG. 1;

FIG. 5 is a diagram showing a PMT distributed by a broadcasting station to the liquid crystal television according to the embodiment shown in FIG. 1;

FIG. 6 is a diagram showing a TVCT distributed by the broadcasting station to the liquid crystal television according to the embodiment shown in FIG. 1;

FIG. 7 is a diagram showing a CVCT distributed by the broadcasting station to the liquid crystal television according to the embodiment shown in FIG. 1;

FIGS. 8 to 10 are flow charts showing control operations in program selection on a selected screen of a display portion of the liquid crystal television according to the embodiment shown in FIG. 1;

DESCRIPTION OF THE PREFERRED EMBODIMENTS

An embodiment of the present invention is now described with reference to the drawings.

The structure of a liquid crystal television 100 according to this embodiment is described with reference to FIGS. 1 to 7. In this embodiment, the liquid crystal television 100 corresponding to digital television broadcasting is described as an exemplary display.

Figure 1:
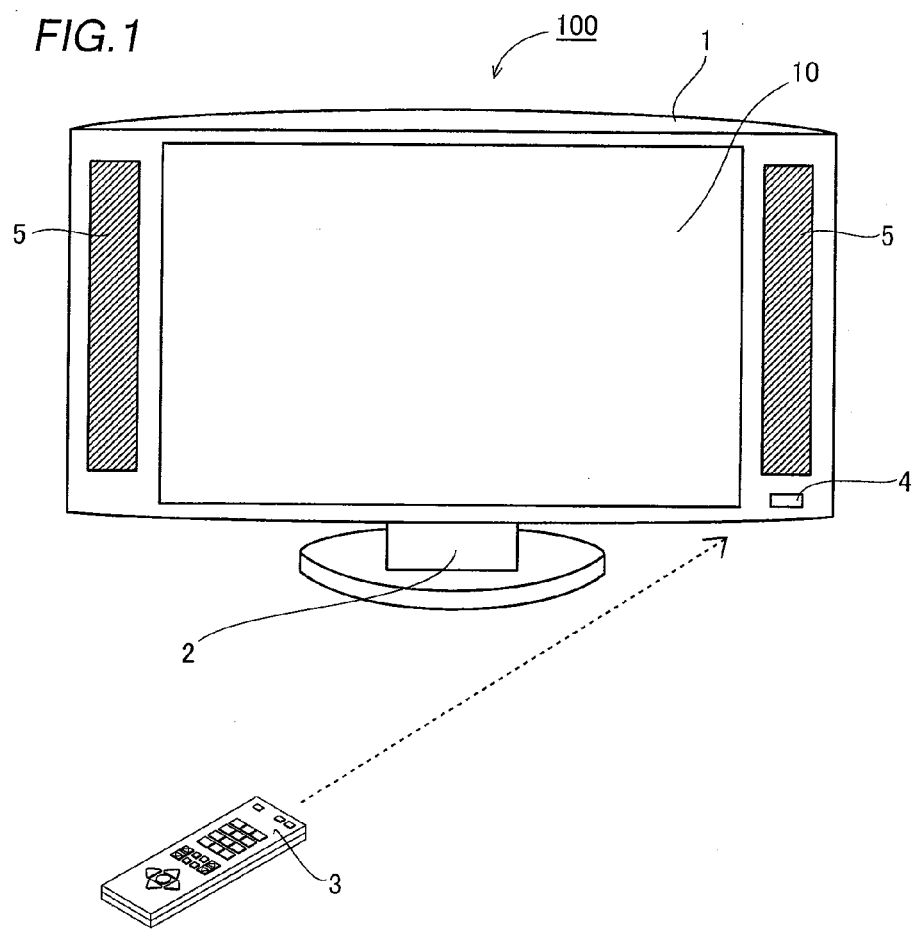
FIG. 1 is a diagram showing the overall structure of a liquid crystal television according to an embodiment of the present invention.

The liquid crystal television 100 corresponding to digital television broadcasting according to the embodiment of the present invention is constituted of a main body 1, a leg portion 2 supporting the main body 1 and a remote control 3, as shown in FIG. 1.

As shown in FIG. 1, further, a display portion 10 for displaying pictures, a photoreceiving portion 4 receiving optical signals transmitted from the remote control 3 allowing the user to operate the main body 1 and a speaker portion 5 generating sounds frontward are provided on the front surface of the main body 1.

Figure 2:
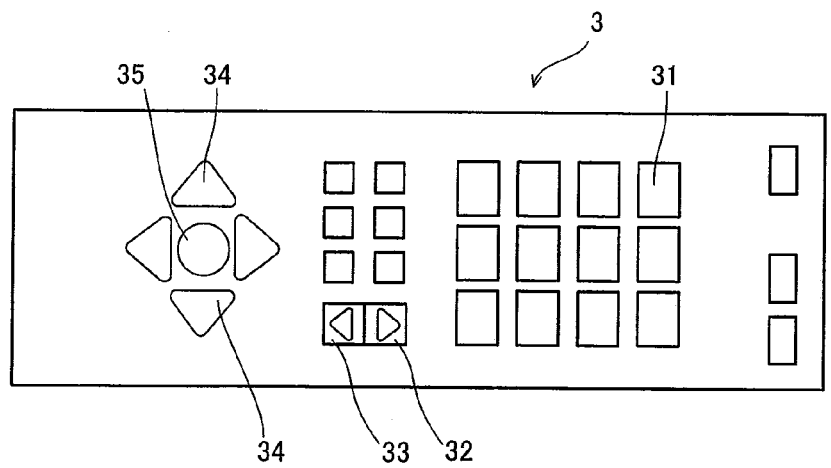
FIG. 2 is a plan view showing the structure of a remote control of the liquid crystal television according to the embodiment shown in FIG. 1.

The remote control 3 includes direct selection buttons 31 allowing the user to select programs by directly inputting channel numbers (physical channel numbers and subchannel numbers), a channel-up button 32 and a channel-down button 33 for selecting the programs by switching the same in order of the channel numbers, and moving buttons 34 and a decision button 35 for rendering one of two program display screens 11a and 11b (described later) of the display portion 10 active (bringing one of the program display screens 11a and 11b into a selected state), as shown in FIG. 2.

Figure 3:
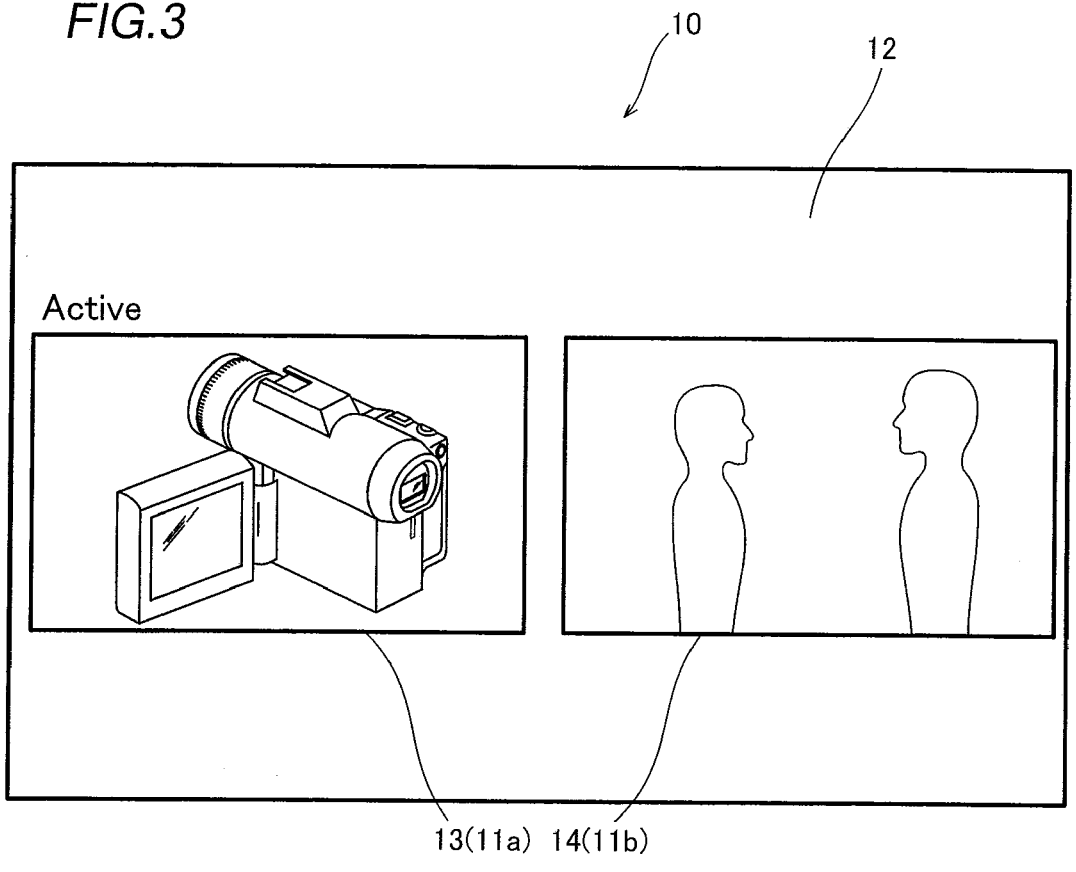
FIG. 3 is a diagram for illustrating a two-screen display function of the liquid crystal television according to the embodiment shown in FIG. 1.
Figure 9:
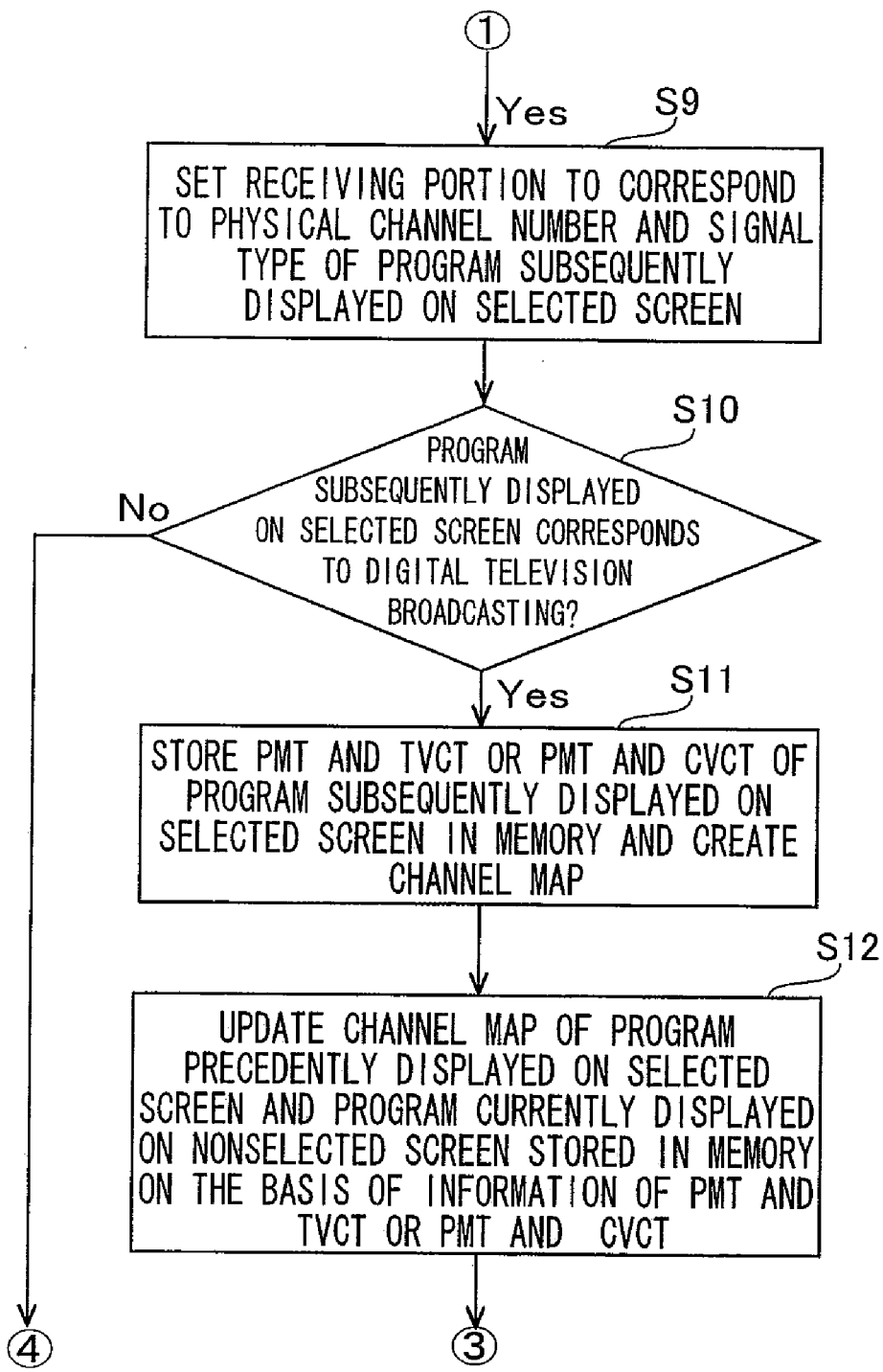

The display portion 10 is so formed that the user can select an ordinary one-screen display function (not shown) displaying one program on one screen and a two-screen display function capable of simultaneously displaying two programs on the two program display screens 11a and 11b adjacent to each other respectively as shown in FIG. 3. More specifically, the display portion 10 includes the two program display screens 11a and 11b allowing the user to switch programs displayed thereon with the remote control 3 (see FIG. 2) or the like and an OSD (On Screen Display) screen 12 provided on a region other than the program display screens 11a and 11b. When the user operates the remote control 3 (see FIG. 2) for switching the program display screen 11a along arrow X1 with any of the moving buttons 34 (see FIG. 2) and selecting the same with the decision button 35 (see FIG. 2), for example, the program display screen 11a along arrow X1 is rendered active (brought into a selected state) as a selected screen 13. At this time, a display "Active" appears above the selected screen 13, so that the display portion 10 informs the user that the program display screen 11a along arrow X1 is selected as the selected screen 13. The program display screen 11b along arrow X2 is so formed as to display a program without accepting an operation of the user in a state of a nonselected screen 14 when not switched to active (brought into the selected state) by the user operating the remote control 3 (see FIG. 2). The program display screens 11a and 11b are examples of the "first display screen portion" and the "second display screen portion" in the present invention respectively. The selected screen 13 is an example of the "first display screen portion" or the "selected screen portion" in the present invention, and the nonselected screen 14 is an example of the "second display screen portion" or the "nonselected screen portion" in the present invention.

The liquid crystal television 100 is provided therein with a control circuit portion 40, as shown in FIG. 4. This control circuit portion 40 includes an external input portion 41 inputting pictures such as those of a DVD player provided outside the liquid crystal television 100 and two receiving portions 42 and 43 receiving digital television broadcasting and analog television broadcasting distributed by broadcasting stations through an antenna 20. The external input portion 41 and the two receiving portions 42 and 43 are connected to an AV selector 44 having a function of switching input/output of picture signals and sound signals. A control portion 49 described later sets the two receiving portions 42 and 43 on the basis of signal types (digital television broadcasting or analog television broadcasting) and physical channel numbers of the received programs.

The two receiving portions 42 and 43 are so formed as to convert analog picture signals and analog sound signals received therein to digital signals and transmit the same to an AV decoder 46 described later when receiving analog television broadcasting from the broadcasting stations. Further, the two receiving portions 42 and 43 are so formed as to receive TSs (Transport Streams: digital broadcast signals) including pictures, sounds, program identification information etc. of programs distributed by the broadcasting stations when receiving digital television broadcasting from the broadcasting stations. In the TSs, pictures, sounds, program identification information etc. are grouped every constant quantity of data as packets, which in turn are distributed by the broadcasting stations in multiplexed states. Digital television broadcasting in this embodiment is broadcasting based on ATSC A/65C standards (PSIP standards: Program and System Information Protocol standards) according to ATSC (Advanced Television Systems Committee).

A transport processing portion 45 storing program identification information necessary for identifying the programs of digital television broadcasting received by the receiving portions 42 and 43 in a memory 50 described later and the AV decoder 46 decoding picture signals and sound signals received from the external input portion 41 and the receiving portions 42 and 43 are connected to the AV selector 44 of the control circuit portion 40. The AV decoder 46 has a function of decoding each picture signal (shown by a one-chain dot line) and each sound signal (shown by a broken line) separated by the AV selector 44 respectively and generating picture data and sound data.

A picture processing portion 47 processing the picture signal received from the AV decoder 46 and a sound processing portion 48 processing the sound signal (including a sound signal via the AV decoder 46) received from the AV selector 44 are connected to the AV decoder 46. The picture processing portion 47 is connected to the display portion 10, and has a function of outputting pictures of the programs of digital television broadcasting and analog television broadcasting to the display portion 10 after the control portion 49 described later performs D-A conversion (digital-to-analog conversion). The sound processing portion 48 has a function of outputting sounds of the programs of digital television broadcasting and analog television broadcasting to the display portion 10 after the control portion 49 described later performs D-A conversion (digital-to-analog conversion).

According to this embodiment, the control circuit portion 40 further includes the control portion 49 formed by a CPU for controlling the overall liquid crystal television 100 and the memory 50 storing the program identification information of the programs of digital television broadcasting and analog television broadcasting received by the receiving portions 42 and 43 from the broadcasting stations. The photoreceiving portion 4 is connected to the control portion 49, so that the user can remotely control the liquid crystal television 100 with the optical signals received by the photoreceiving portion 4 from the remote control 3. Buses (transmission lines) 51 interconnect the respective portions of the control circuit portion 40 with each other, so that the portions can communicate control signals and control data to each other. The memory 50 is an example of the "storage portion" in the present invention.

The control portion 49 is so formed as to identify programs displayed on the display portion 10 through the signal types (digital television broadcasting, analog television broadcasting or external input) and the channel numbers when displaying programs of analog television broadcasting. More specifically, the control portion 49 is so formed as to create a channel map to include physical channel numbers and signal types, corresponding to the channel numbers specified by the user, distributed by the broadcasting stations along with the programs and to store the channel map in the memory 50 when displaying the programs of analog television broadcasting on the display portion 10 in response to an operation of the user. Further, the control portion 49 is so formed as to identify the programs displayed on the display portion 10 with the channel map stored in the memory 50.

According to this embodiment, the control portion 49 is so formed as to display a program other than the program currently displayed on the nonselected screen 14 (see FIG. 3) on the selected screen 13 (see FIG. 3) if a program newly displayed on the selected screen 13 is identical to the program currently displayed on the nonselected screen 14 when the user switches the program displayed on the selected screen 13. More specifically, the control portion 49 is so formed as to store the program identification information of the programs currently displayed on the selected screen 13 (see FIG. 3) and the nonselected screen 14 (see FIG. 3) received by the receiving portions 42 and 43 along with the picture information in the memory 50 as the channel map, acquire the program identification information of the program currently displayed on the nonselected screen 14 stored in the memory 50 and the program identification information of the program specified by the user to be subsequently displayed on the selected screen 13 from the channel map and compare the same with each other.

According to this embodiment, the control portion 49 is so formed as to create a channel map corresponding to programs of digital television broadcasting and to identify the programs displayed on the display portion 10 with the channel map when displaying the programs on the display portion 10. This channel map is so formed that a PMT (Program Map Table (see FIG. 5)), a TVCT (Terrestrial Virtual Channel Table (see FIG. 6)) corresponding to ground wave digital television broadcasting based on the ATSC A/65C standards and a CVCT (Cable Virtual Channel Table (see FIG. 7)) corresponding to cable digital television broadcasting are selectively stored in the memory 50 from the TSs and the control portion 49 creates the channel map with the PMT, TVCT and CVCT stored in the memory 50.

More specifically, the TSs received by the receiving portions 42 and 43 include the PMT and the TVCT when digital television broadcasting received by the receiving portions 42 and 43 is ground wave digital television broadcasting. When digital television broadcasting received by the receiving portions 42 and 43 is cable digital television broadcasting, on the other hand, the TSs received by the receiving portions 42 and 43 include the PMT and the CVCT. Thus, the control portion 49 is so formed as to create the channel map with the PMT and the TVCT when the receiving portions 42 and 43 receive ground wave digital television broadcasting and to create the channel map with the PMT and the CVCT when the receiving portions 42 and 43 receive cable digital television broadcasting.

The PMT, the TVCT and the CVCT are distributed every program of digital television broadcasting as the program identification information of the program from the corresponding broadcasting station. The control portion 49 is so formed as to store the channel map in the memory 50 and to update the channel map every time the user changes the programs displayed on the display portion 10.

The control portion 49 is so formed as to identify the program included in each TS through a combination of a program_number 71 (see FIG. 5) included in the PMT and a program_number 81 (see FIG. 6) included in the TVCT or a combination of the program_number 71 (see FIG. 5) included in the PMT and a program_number 91 (see FIG. 7) included in the CVCT. The program_numbers 71, 81 and 91 are examples of the "program identification information" in the present invention.

In relation to a program of digital television broadcasting, a plurality of subchannel numbers may be present for one physical channel number (virtual channel number). The physical channel number is allocated correspondingly to the frequency band allowed to digital television broadcasting. The subchannel numbers are so allocated that a plurality of programs can be individually selected in a certain physical channel number in digital television broadcasting. The control portion 49 is so formed as to guide the corresponding physical channel number (virtual channel number) from a major_channel_number 82 (see FIG. 6) included in the TVCT or a major_channel_number 92 (see FIG. 7) included in the CVCT and to guide the corresponding subchannel number from a minor_channel_number 83 (see FIG. 6) included in the TVCT or a minor_channel_number 93 included in the CVCT when creating the channel map. The physical channel number and the subchannel number are examples of the "program identification information" or the "channel number" in the present invention. The major_channel_number 82, the minor_channel_number 83, the major_channel_number 92 and the minor_channel_number 93 are also examples of the "program identification information" or the "channel number" in the present invention.

The control portion 49 is so formed as to utilize a source ID in order to identify the title of each program. This source ID is guided from a source_ID 84 (see FIG. 6) included in the TVCT or a source_ID 94 (see FIG. 7) included in the CVCT. Further, the control portion 49 is so formed as to utilize a video PID (Packet ID) and an audio PID in order to identify pictures and sounds of the program. The video PID and the audio PID are guided from a descriptor 85 included in the TVCT or a descriptor 95 included in the CVCT. In addition, the control portion 49 is so formed as to create the channel map with the physical channel number (major_channel_number), the subchannel number (minor_channel_number), the source ID (source_ID), the video PID and the audio PID and to store the created channel map in the memory 50. The source_IDs 84 and 94 are examples of the "program identification information" or the "program identifier" in the present invention, and the video PID is an example of the "program identification information" or the "picture identifier" in the present invention.

According to this embodiment, the control portion 49 is so formed as to receive programs of digital television broadcasting and analog television broadcasting only from the receiving portion 42 when the user selects the one-screen display function for the display portion 10 by operating the remote control 3 and to receive programs of digital television broadcasting and analog television broadcasting from both of the receiving portions 42 and 43 when the user selects the two-screen display function (see FIG. 3). Thus, the control portion 49 can simultaneously televise different programs on the display portion 10.

Control operations of the liquid crystal television 100 according to this embodiment are now described with reference to FIGS. 2 to 14.

When the user selects the two-screen display function and the program display screen 11a along arrow X1 serves as the selected screen 13 as shown in FIG. 3, the control portion 49 (see FIG. 4) determines whether or not the photoreceiving portion 4 (see FIG. 4) has received a signal transmitted when the user has pressed the channel-up button 32 (see FIG. 2) of the remote control 3 (see FIG. 2) at a step S1, as shown in FIG. 8. If determining that the photoreceiving portion 4 has received the signal transmitted when the user has pressed the channel-up button 32 of the remote control 3 at the step S1, the control portion 49 advances to a step S3. If determining that the photoreceiving portion 4 has not received the signal transmitted when the user has pressed the channel-up button 32 of the remote control 3 at the step S1, on the other hand, the control portion 49 repeats the determination at the step S1.

At the step S2, the control portion 49 acquires program identification information of a program subsequently displayed on the selected screen 13 from the channel map, and advances to a step S3. At this time, the control portion 49 acquires the corresponding physical channel number if the program subsequently displayed on the selected screen 13 is a program of analog television broadcasting. If the program subsequently displayed on the selected screen 13 is a program of digital television broadcasting, on the other hand, the control portion 49 acquires the corresponding program number, the corresponding physical channel number (virtual channel number) and the corresponding subchannel number. If the program subsequently displayed on the selected screen 13 is the program of digital television broadcasting, program identification information acquired by the control portion 49 from the channel map includes the program number (program_number 71 (see FIG. 5) included in the PMT, program_number 81 (see FIG. 6) included in the TVCT or program_number 91 (see FIG. 7) included in the CVCT), the physical channel number (virtual channel number: major_channel_number 82 (see FIG. 6) included in the TVCT or major_channel_number 92 (see FIG. 7) included in the CVCT)) and the subchannel number (minor_channel_number 83 (see FIG. 6) included in the TVCT or minor_channel_number 93 included in the CVCT).

Figure 11:
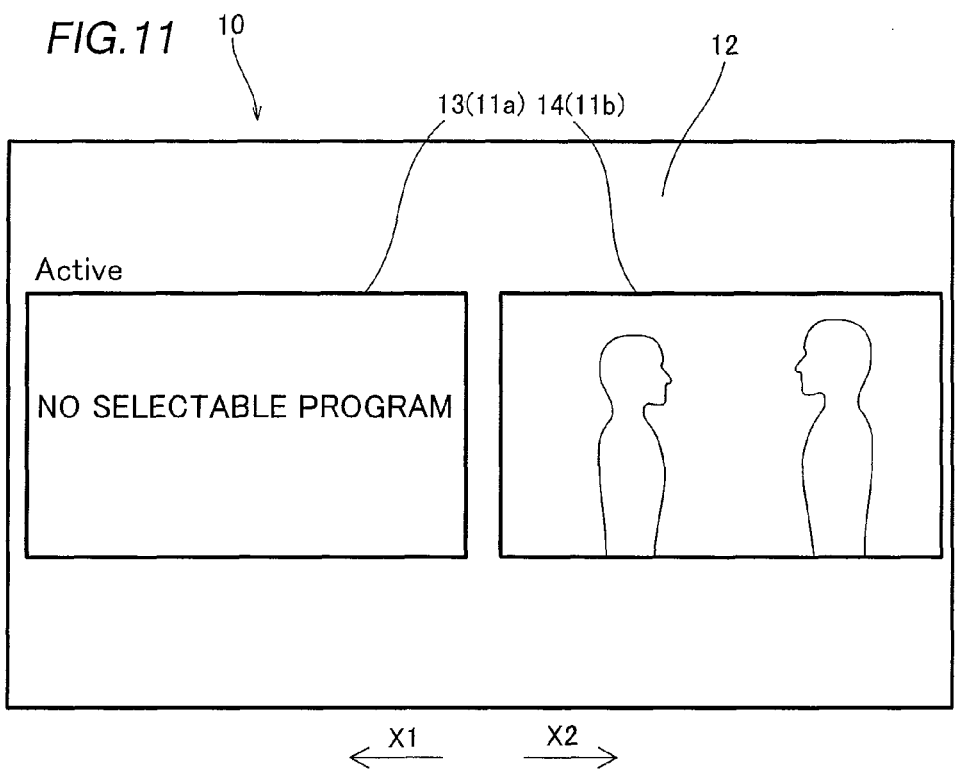
FIGS. 11 to 14 are diagrams for illustrating screens displayed on the display portion in the program selection on the selected screen of the display portion of the liquid crystal television according to the embodiment shown in FIG. 1.

At the step S3, the control portion 49 determines whether or not the program identification information of the program subsequently displayed on the selected screen 13 matches the program identification information of the program currently displayed on the selected screen 13. If determining that the program identification information of the program subsequently displayed on the selected screen 13 is identical to the program identification information of the program currently displayed on the selected screen 13 at the step S3, the control portion 49 determines that there is no selectable program. In this case, the control portion 49 advances to a step S30 so that the selected screen 13 displays "no selectable program" as shown in FIG. 11, and terminates the processing. If determining that the program identification information of the program subsequently displayed on the selected screen 13 is not identical to the program identification information of the program currently displayed on the selected screen 13 at the step S3, on the other hand, the control portion 49 advances to a step S4, as shown in FIG. 8.

At the step S4, the control portion 49 determines whether or not the program identification information of the program subsequently displayed on the selected screen 13 acquired at the step S2 matches the program identification information of the program currently displayed on the nonselected screen 14. If determining that the program identification information of the program subsequently displayed on the selected screen 13 is identical to the program identification information of the program currently displayed on the nonselected screen 14, the control portion 49 returns to the step S2 to acquire program identification information of a program of a subsequent physical channel number, and repeats the processing at the steps S3 and S4. In other words, the control portion 49 determines whether or not the program identification information of the program of the subsequent physical channel number matches the program identification information of the program currently displayed on the nonselected screen 14, thereby determining whether or not the program is displayable on the selected screen 13. Consequently, the selected screen 13 displays the program of the subsequent physical channel number.

If determining that the program identification information of the program subsequently displayed on the selected screen 13 is not identical to the program identification information of the program currently displayed on the nonselected screen 14 at the step S4, on the other hand, the control portion 49 advances to a step S5.

Figure 12:
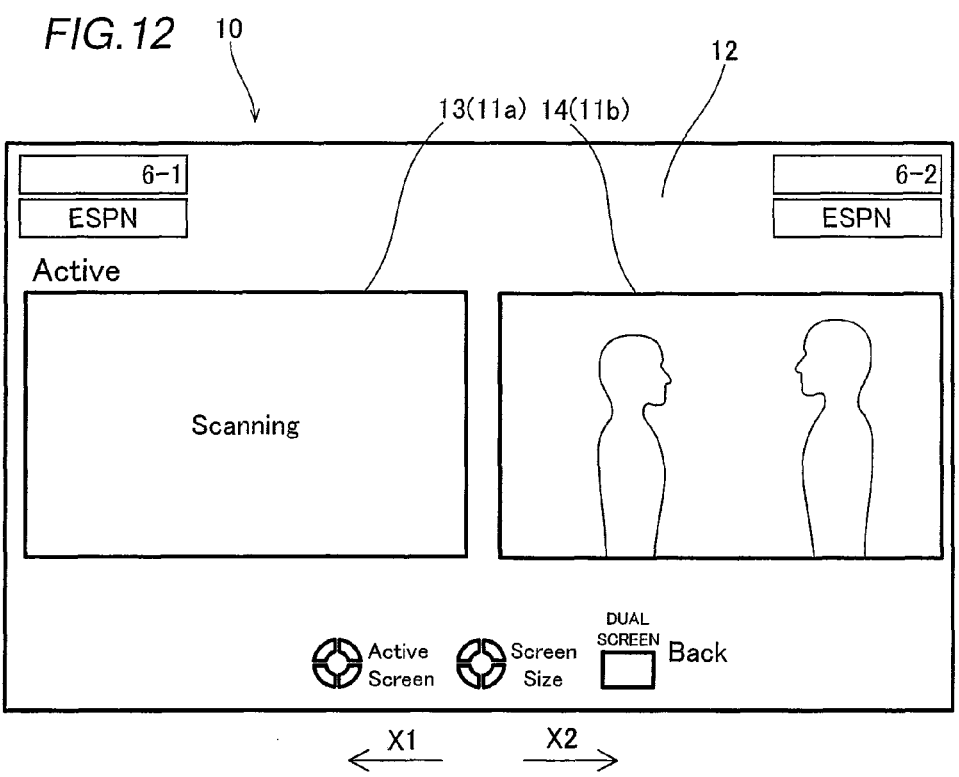

At the step S5, the control portion 49 stores the program identification information acquired at the step S2 in the memory 50 as the program identification information of the program subsequently displayed on the selected screen 13 (see FIG. 3), and advances to a step S6. At the step S6, the control portion 49 displays the channel numbers etc. of the programs currently displayed on the program display screens 11a and 11b (see FIG. 3) on the OSD screen 12 (see FIG. 3), and advances to a step S7. At this time, the OSD screen 12 displays the channel numbers of the programs currently displayed on the program display screens 11a and 11b, the names of the corresponding broadcasting stations and various set screens, as shown in FIG. 12. At the step S7, the control portion 49 displays "Scanning" indicating that the same is in search of the program to be displayed on the selected screen 13 as shown in FIG. 8, and advances to a step S8. In other words, the control portion 49 displays "Scanning" at the center of the selected screen 13, as shown in FIG. 12. At the step S8, the control portion 49 mutes the sounds of the program currently displayed on the selected screen 13, and advances to a step S9 shown in FIG. 9.

At the step S9, the control portion 49 sets the receiving portion 42 or 43 to correspond to the physical channel number (virtual channel number) and the signal type (digital television broadcasting or analog television broadcasting) of the program subsequently displayed on the selected screen 13, and advances to a step S10. At the step S10, the control portion 49 determines whether or not the program subsequently displayed on the selected screen 13 corresponds to digital television broadcasting. The control portion 49 advances to a step S11 if determining that the program subsequently displayed on the selected screen 13 corresponds to digital television broadcasting at the step S10, while advancing to a step S16 (see FIG. 10) described later if determining that the program subsequently displayed on the selected screen 13 corresponds not to digital television broadcasting but to analog television broadcasting at the step S10.

At the step S11, the control portion 49 stores the PMT and the TVCT or the PMT and the CVCT of the program subsequently displayed on the selected screen 13 in the memory 50 while creating a channel map, and advances to a step S12. The control portion 49 stores the PMT and the TVCT in the memory 50 if the program subsequently displayed on the selected screen 13 corresponds to ground wave digital television broadcasting, while storing the PMT and the CVCT in the memory 50 if the program subsequently displayed on the selected screen 13 corresponds to cable digital television broadcasting.

Figure 10:
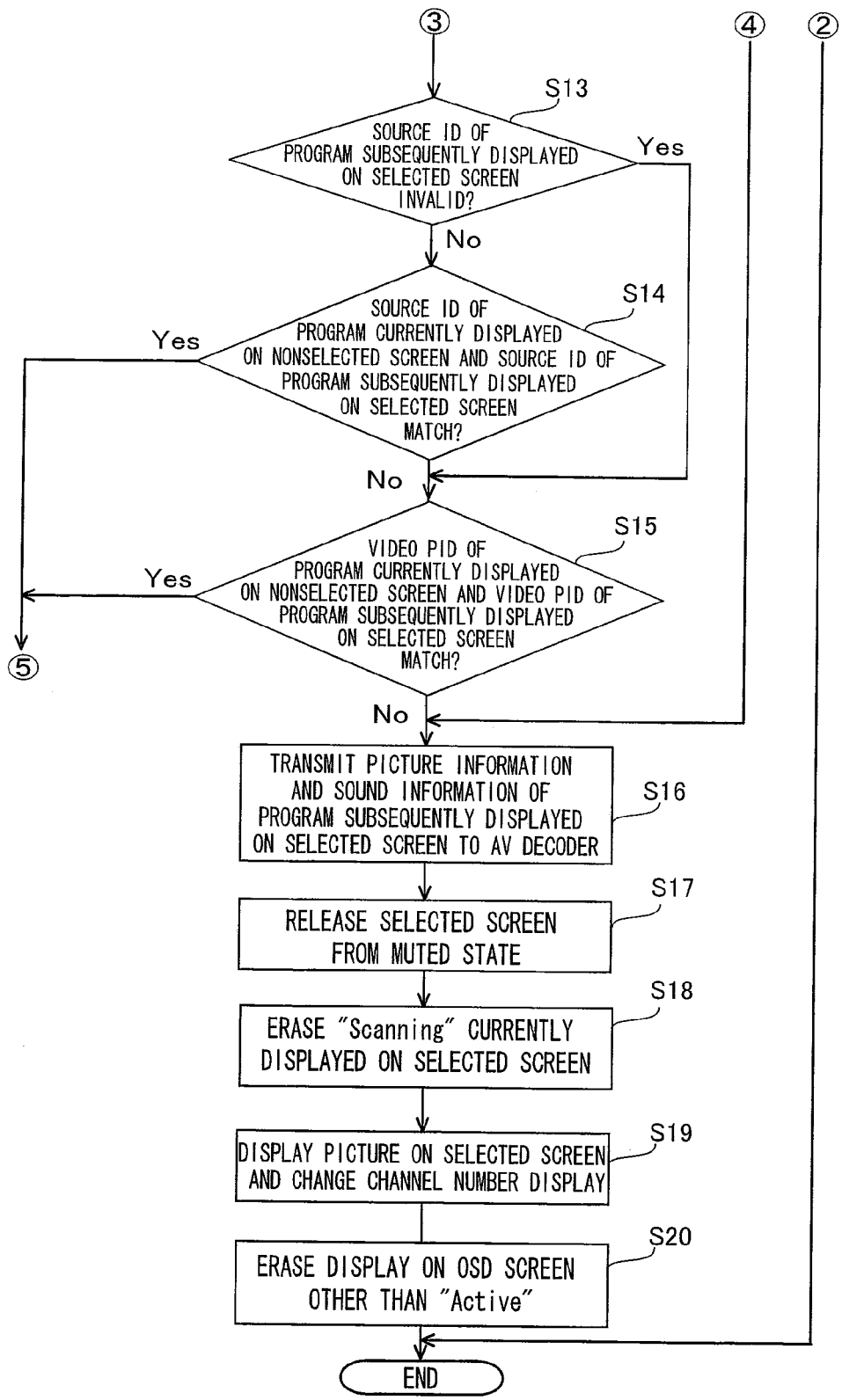

At the step S12, the control portion 49 updates a channel map of a program having been previously displayed on the selected screen 13 and the channel map of the program currently displayed on the nonselected screen 14 on the basis of the PMT and the TVCT or the PMT and the CVCT having been stored in the memory 50 at the step S11, and advances to a step S13 shown in FIG. 10.

At the step S13, the control portion 49 determines whether or not the source ID of the program subsequently displayed on the selected screen 13 is invalid, as shown in FIG. 10. At the step S13, the control portion 49 determines whether or not the source ID of the program subsequently displayed on the selected screen 13 is invalid while also determining whether or not the program subsequently displayed on the selected screen 13 includes the source ID on the basis of the channel map having been stored in the memory 50 at the step S11. If determining that the program subsequently displayed on the selected screen 13 includes no source ID at the step S13, the control portion 49 determines that the source ID is invalid. If determining that the source ID of the program subsequently displayed on the selected screen 13 is invalid at the step S13, the control portion 49 advances to a step S15 described later. If determining that the source ID of the program subsequently displayed on the selected screen 13 is not invalid at the step S13, on the other hand, the control portion 49 advances to a step S14.

According to this embodiment, the control portion 49 determines whether or not the source ID of the program currently displayed on the nonselected screen 14 and the source ID of the program subsequently displayed on the selected screen 13 match each other at the step S14. If determining that the source ID of the program currently displayed on the nonselected screen 14 and the source ID of the program subsequently displayed on the selected screen 13 do not match each other at the step S14, the control portion 49 advances to a step S15. If determining that the source ID of the program currently displayed on the nonselected screen 14 and the source ID of the program subsequently displayed on the selected screen 13 match each other, on the other hand, the control portion 49 determines that the program subsequently displayed on the selected screen 13 has the same contents as the program currently displayed on the nonselected screen 14. In this case, the control portion 49 returns to the step S2 (see FIG. 8), and acquires the program identification information of a further physical channel number or a further subchannel number.

According to this embodiment, the control portion 49 determines whether or not the video PID of the program currently displayed on the nonselected screen 14 and the video PID of the program subsequently displayed on the selected screen 13 match each other at the step S15. If determining that the video PID of the program currently displayed on the nonselected screen 14 and the video PID of the program subsequently displayed on the selected screen 13 do not match each other at the step S15, the control portion 49 advances to a step S15. If determining that the video PID of the program currently displayed on the nonselected screen 14 and the video PID of the program subsequently displayed on the selected screen 13 match each other at the step S15, on the other hand, the control portion 49 determines that the program subsequently displayed on the selected screen 13 has the same contents as the program currently displayed on the nonselected screen 14. In this case, the control portion 49 returns to the step S2 (see FIG. 8), and acquires the program identification information of a further physical channel number or a further subchannel number. In other words, the control portion 49 displays a program other than the program currently displayed on the nonselected screen 14 on the selected screen 13 if determining that the program subsequently displayed on the selected screen 13 has the same contents as the program currently displayed on the nonselected screen 14 at the steps S14 and S15.

At the step S16, the control portion 49 transmits picture information and sound information of the program subsequently displayed on the selected screen 13 to the AV decoder 46. At a step S17, the control portion 49 releases the selected screen 13 from the muted state, thereby generating the sounds of the program subsequently displayed on the selected screen 13.

Figure 13:
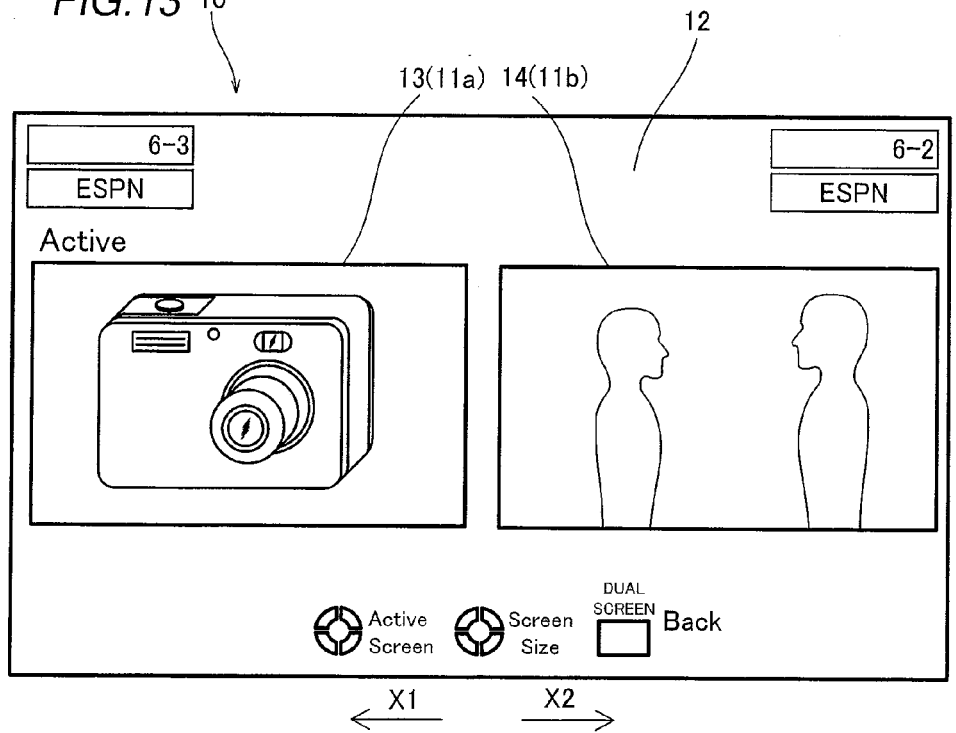
Figure 14:
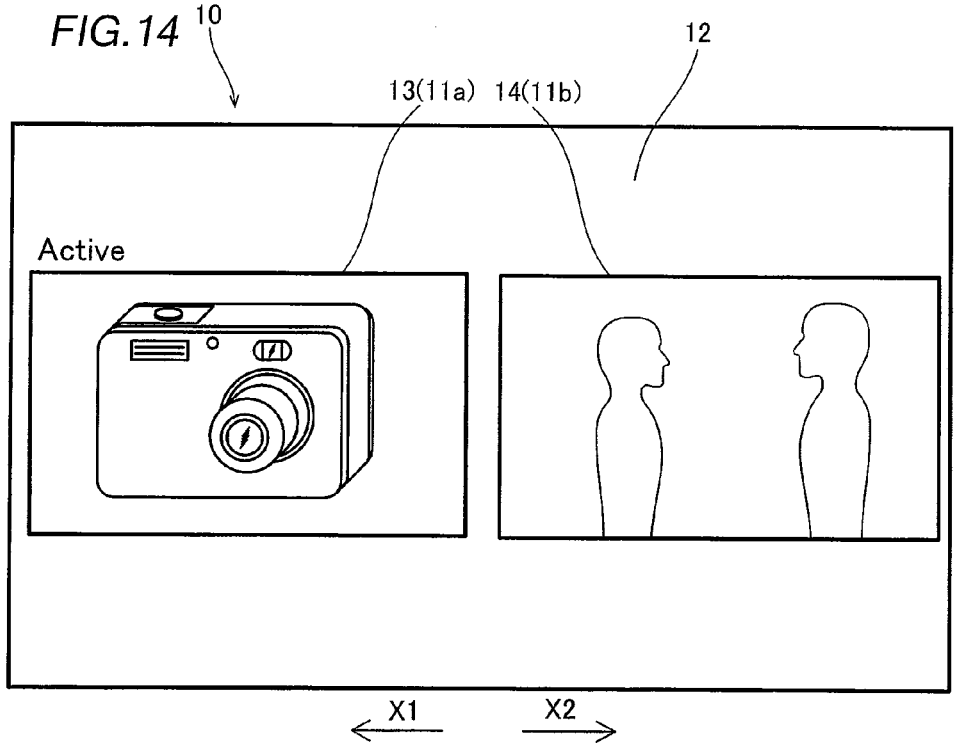

At a step S18, the control portion 49 erases "Scanning" currently displayed on the selected screen 13. The control portion 49 displays pictures of the program subsequently displayed on the selected screen 13 and changes the channel number display as shown in FIG. 13 at a step S19, and erases the displays on the OSD screen 12 other than "Active" as shown in FIG. 14 at a step S20. Thus, the control portion 49 terminates the processing in program selection (channel switching) in the two-screen display function.

According to this embodiment, as hereinabove described, the liquid crystal television 100 is provided with the display portion 10 including the two program display screens 11a and 11b provided to be capable of switching programs and independently displaying the programs thereon by operations of the user and the control portion 49 is so formed as to control the selected screen 13 to display a program other than the program displayed on the nonselected screen 14 if the program subsequently displayed on the selected screen 13 and the program displayed on the nonselected screen 14 are identical to each other when the user performs an operation of selecting the program display screen 11a as the selected screen 13 and switching the programs, whereby the selected screen 13 and the nonselected screen 14 do not simultaneously display pictures of the same program. Thus, the two program display screens 11a and 11b provided to be capable of displaying programs thereon independently of each other can be inhibited from simultaneously displaying the same program.

According to this embodiment, as hereinabove described, the liquid crystal television 100 is provided with the memory 50 storing the program identification information related to the programs displayed on the selected screen 13 and the nonselected screen 14 of the display portion 10 and the control portion 49 is so formed as to determine whether or not the program subsequently displayed on the selected screen 13 and the program currently displayed on the nonselected screen 14 are identical to each other by comparing the program identification information related to the program currently displayed on the nonselected screen 14 and the program identification information related to the program subsequently displayed on the selected screen 13 with each other when the user performs an operation of switching the program displayed on the selected screen 13 and to control the selected screen 13 to display a program other than the program displayed on the nonselected screen 14 if determining that the programs are identical to each other, whereby the control portion 49 can easily determine whether or not the program subsequently displayed on the selected screen 13 and the program currently displayed on the nonselected screen 14 are identical to each other with the program identification information of the program currently displayed on the nonselected screen 14 and the program identification information of the program subsequently displayed on the selected screen 13 stored in the memory 50. Thus, the selected screen 13 and the nonselected screen 14 can be easily so formed as not to simultaneously display pictures of the same program.

According to this embodiment, as hereinabove described, the control portion 49 is so formed as to acquire the program identification information related to the program currently displayed on the nonselected screen 14 and the program identification information related to the program subsequently displayed on the selected screen 13 from the channel map including the program identification information and compare the same with each other when the user performs the operation of switching the program displayed on the selected screen 13, to be capable of easily comparing the program identification information by acquiring the same from the channel map.

According to this embodiment, as hereinabove described, the control portion 49 is so formed as to update the channel map every time the user changes the program of digital television broadcasting displayed on the display portion 10, to be capable of comparing the program identification information in a state acquiring more recent program identification information from the channel map by updating the channel map.

According to this embodiment, as hereinabove described, the receiving portions 42 and 43 are so formed as to receive program identification information along with picture information of programs from the broadcasting stations while the control portion 49 is so formed as to determine whether or not the program subsequently displayed on the selected screen 13 and the program currently displayed on the nonselected screen 14 are identical to each other by comparing the program identification information received by the receiving portions 42 and 43, whereby the control portion 49 can easily determine whether or not the program subsequently displayed on the selected screen 13 and the program currently displayed on the nonselected screen 14 are identical to each other with the program identification information received by the receiving portions 42 and 43 and display a program other than the program displayed on the nonselected screen 14 on the selected screen 13 if determining that the programs are identical to each other.

According to this embodiment, as hereinabove described, the control portion 49 is so formed as to determine whether or not the program subsequently displayed on the selected screen 13 and the program currently displayed on the nonselected screen 14 are identical to each other by comparing the physical channel number of the program currently displayed on the nonselected screen 14 and the physical channel number of the program subsequently displayed on the selected screen 13 stored in the memory 50 with each other when the user performs the operation of switching the program displayed on the selected screen 13 and to control the selected screen 13 to display a program other than the program displayed on the nonselected screen 14 if determining that the programs are identical to each other so that the control portion 49 can easily determine whether or not the program subsequently displayed on the selected screen 13 and the program currently displayed on the nonselected screen 14 are identical to each other with the physical channel numbers distributed by the broadcasting stations along with the programs of digital television broadcasting and analog television broadcasting, whereby the selected screen 13 and the nonselected screen 14 can be so formed as not to simultaneously display pictures of the same program.

According to this embodiment, as hereinabove described, the control portion 49 is so formed as to display a program of a physical channel number or a subchannel number subsequent to the physical channel number or the subchannel number of the program displayed on the nonselected screen 14 on the selected screen 13 if the physical channel number or the subchannel number of the program subsequently displayed on the selected screen 13 and the physical channel number or the subchannel number of the program displayed on the nonselected screen 14 are identical to each other when the user changes the program displayed on the selected screen 13 in order of the physical channel number (virtual channel number) or the subchannel number, to be capable of more reliably determining whether or not the program subsequently displayed on the selected screen 13 and the program currently displayed on the nonselected screen 14 are identical to each other and to control the selected screen 13 to display a program different from the program currently displayed on the nonselected screen 14 even if a plurality of programs correspond to the physical channel number.

According to this embodiment, as hereinabove described, the control portion 49 is so formed as to determine whether or not the program identification information of the subsequent physical channel number matches the program identification information of the program currently displayed on the nonselected screen 14 and to display the program of the subsequent channel number on the selected screen 13, to be capable of more easily controlling the selected screen 13 to display a program different from the program currently displayed on the nonselected screen 14.

According to this embodiment, as hereinabove described, the control portion 49 is so formed as to determine whether or not the program subsequently displayed on the selected screen 13 and the program currently displayed on the nonselected screen 14 are identical to each other by comparing the source ID and the video PID of the program currently displayed on the nonselected screen 14 and the source ID and the video PID of the program subsequently displayed on the selected screen 13 with each other when the nonselected screen 14 displays a program of digital television broadcasting and the program subsequently displayed on the selected screen 13 corresponds to digital television broadcasting and to control the selected screen 13 to display a program other than the program currently displayed on the nonselected screen 14 if the source IDs and the video PIDs are identical to each other so that the control portion 49 can easily determine whether or not the program subsequently displayed on the selected screen 13 and the program currently displayed on the nonselected screen 14 are identical to each other with the source IDs and the video PIDs corresponding to programs of digital television broadcasting, whereby the selected screen 13 and the nonselected screen 14 can be reliably so formed as not to simultaneously display pictures of the same program.

According to this embodiment, as hereinabove described, the control portion 49 is so formed as to compare the video PID of the program currently displayed on the nonselected screen 14 and the video PID of the program subsequently displayed on the selected screen 13 with each other when the source ID is invalid, to be capable of reliably determining whether or not the program subsequently displayed on the selected screen 13 and the program currently displayed on the nonselected screen 14 are identical to each other even if the source ID is invalid.

Although the present invention has been described and illustrated in detail, it is clearly understood that the same is by way of illustration and example only and is not to be taken by way of limitation, the spirit and scope of the present invention being limited only by the terms of the appended claims.

For example, while the liquid crystal television is shown as the exemplary display in the aforementioned embodiment, the present invention is not restricted to this. The present invention is also applicable to a display, such as a CRT television, a plasma television or a rear projection television, other than the liquid crystal television so far as the same comprises a display portion having two display screen portions provided to be capable of displaying programs thereon independently of each other.

While the channel numbers, the program numbers, the source IDs and the video PIDs are employed as the program identification information of the program subsequently displayed on the selected screen and the program identification information of the program currently displayed on the nonselected screen to be compared with each other in the aforementioned embodiment, the present invention is not restricted to this. According to the present invention, the control portion may alternatively compare other information of the program subsequently displayed on the selected screen and other information of the program currently displayed on the nonselected screen with each other.

While the user changes the program displayed on the selected screen along the order (channel-up operation) of the physical channel number and the subchannel number as an exemplary operation of changing the program displayed on the selected screen in the aforementioned embodiment, the present invention is not restricted to this. The present invention is also applicable to a case of changing a program by direct selection specifying a channel number with a remote control or the like.

While the user changes the physical channel number and the subchannel number of the program displayed on the selected screen with the channel-up button of the remote control in the aforementioned embodiment, the present invention is not restricted to this. According to the present invention, the user may alternatively change the program displayed on the selected screen by changing the physical channel number and the subchannel number with the channel-down button.

While the aforementioned embodiment shows ground wave digital television broadcasting and cable digital television broadcasting according to ATSC standards as examples of digital television broadcasting, the present invention is not restricted to this. The present invention is also applicable to programs of digital television broadcasting distributed according to standards such as DVB (Digital Video Broadcasting) standards or ISDB (Integrated Services Digital Broadcasting) standards, for example, other than the ATSC standards.

While the two program display screens are provided to be adjacent to each other in the horizontal direction (along arrows X1 and X2) as an exemplary two-screen display function of the display portion in the aforementioned embodiment, the present invention is not restricted to this. According to the present invention, the two program display screens may alternatively be provided to be adjacent to each other in the vertical direction. Further alternatively, the second program display screen may be partially overlapped on the first program display screen.

While the control portion is so formed as to update the channel map every time the user changes the programs of digital television broadcasting displayed on the display portion in the aforementioned embodiment, the present invention is not restricted to this. According to the present invention, the control portion may alternatively not update the channel map every time the user changes the programs of digital television broadcasting.

Figure 15:
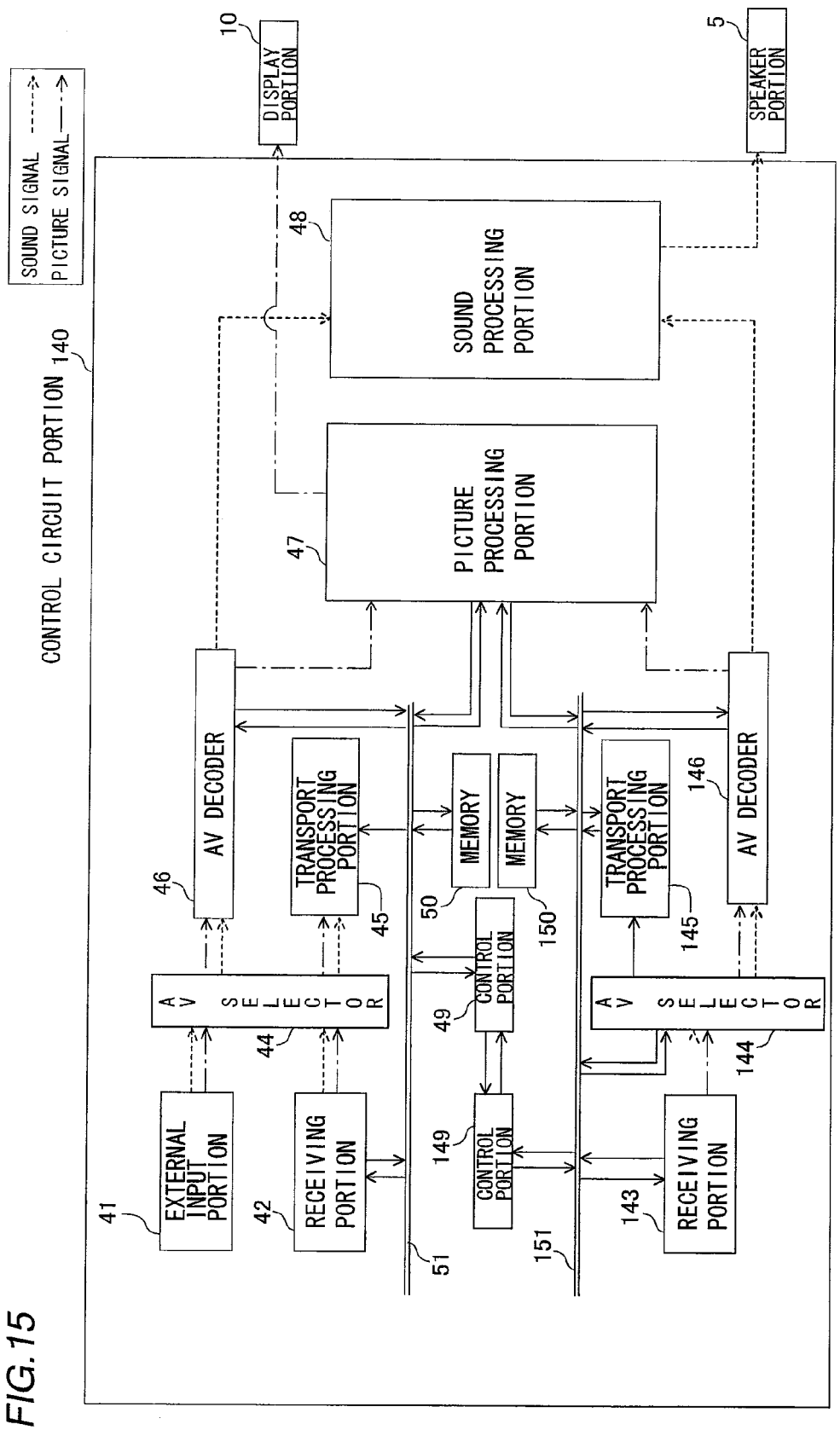
FIG. 15 is a block diagram showing a control circuit portion according to a modification of the present invention.

While the control circuit portion includes one control portion, one storage portion, one AV selector, one transport processing portion and one AV decoder with respect to the two receiving portions as an exemplary control circuit portion in the aforementioned embodiment, the present invention is not restricted to this. According to the present invention, a control circuit portion including one control portion, one storage portion, one AV selector, one transport processing portion and one AV decoder with respect to each receiving portion may alternatively be provided. For example, a control circuit portion 140 including an external input portion 41, a receiving portion 42, an AV selector 44, a transport processing portion 45, an AV decoder 46, a control portion 49, a memory 50 and a bus 51 as well as an AV selector 144, a transport processing portion 145, an AV decoder 146, a control portion 149, a memory 150 and a bus 151 connected to a receiving portion 143 provided independently of the receiving portion 42 and further including a picture processing portion 47 and a sound processing portion 48 connected to the AV decoders 46 and 146 may be provided, as in a modification shown in FIG. 15. According to this modification, the control portions 49 and 149 are connected with each other, so that pictures displayed on a selected screen are decided on the basis of communication between the control portions 49 and 149 when a two-screen display function is utilized. The memory 150 is an example of the "storage portion" in the present invention.

What is claimed is:

1. A display comprising:
a display portion including a first display screen portion capable of switching a program displayed thereon by an operation of the user and a second display screen portion provided to be capable of displaying a program thereon independently of said first display screen portion and capable of switching a program of digital television broadcasting displayed thereon by an operation of the user;
a control portion determining whether or not said program subsequently displayed on said selected screen portion and said program currently displayed on said nonselected screen portion are identical to each other by comparing program identification information related to said program currently displayed on said nonselected screen portion and program identification information related to said program subsequently displayed on said selected screen portion with each other, and controlling said selected screen portion to display a program other than a program displayed on a nonselected screen portion corresponding to the nonselected one of said first and second display screen portions if a program subsequently displayed on said selected screen portion and said program displayed on said nonselected screen portion are identical to each other, when the user performs an operation of selecting either said first display screen portion or said second display screen portion as a selected screen portion and switching a program, and
a receiving portion receiving a picture of said program of digital television broadcasting distributed by a broadcasting station and displayed on said display portion, wherein
said control portion is so formed as to acquire said program identification information related to said program of digital television broadcasting currently displayed on said nonselected screen portion and said program identification information related to said program of digital television broadcasting subsequently displayed on said selected screen portion from a channel map including said program identification information and to compare the same with each other and to update said channel map every time said operation is performed by the user on the basis of said program identification information related to said program of digital television broadcasting subsequently displayed on said selected screen portion, when the user performs said operation of switching said program displayed on said selected screen portion, said receiving portion is so formed as to receive said program identification information from said broadcasting station along with picture information of said program, said control portion is so formed as to determine whether or not said program subsequently displayed on said selected screen portion and said program currently displayed on said nonselected screen portion are identical to each other by comparing said program identification information received by said receiving portion said program identification information includes channel numbers corresponding to said program of digital television broadcasting distributed by said broadcasting station and received by said receiving portion, said control portion is so formed as to determine whether or not said program subsequently displayed on said selected screen portion and said program currently displayed on said nonselected screen portion are identical to each other by comparing said channel number of said program currently displayed on said nonselected screen portion and said channel number of said program subsequently displayed on said selected screen portion with each other when the user performs said operation of switching said program displayed on said selected screen portion and to control said selected screen portion to display said program other than said program displayed on said nonselected screen portion if said programs are identical to each other, each said channel number has a virtual channel number corresponding to a plurality of programs and a subchannel number corresponding to any one of said plurality of programs corresponding to said virtual channel number, and said control portion is so formed as to compare said virtual channel number and said subchannel number of said program currently displayed on said nonselected screen portion and said virtual channel number and said subchannel number of said program subsequently displayed on said selected screen portion with each other when the user performs said operation of switching said program displayed on said selected screen portion.

2. The display according to claim 1, further comprising a storage portion capable of storing said program identification information related to said program displayed on said selected screen portion of said display portion and said program identification information related to said program displayed on said nonselected screen portion.

3. The display according to claim 1, wherein said control portion is so formed as to display a program of a channel number subsequent to said channel number of said program displayed on said nonselected screen portion on said selected screen portion if said channel number of said program subsequently displayed on said selected screen portion and said channel number of said program displayed on said nonselected screen portion are identical to each other when the user successively switches programs displayed on said selected screen portion in the order of said channel numbers.

4. The display according to claim 1, wherein said program identification information includes a program identifier and a picture identifier corresponding to said program of digital television broadcasting, and said control portion is so formed as to determine whether or not said program subsequently displayed on said selected screen portion and said program currently displayed on said nonselected screen portion are identical to each other by comparing at least either said program identifier or said picture identifier of said program currently displayed on said nonselected screen portion and at least either said program identifier or said picture identifier of said program subsequently displayed on said selected screen portion with each other and to control said selected screen portion to display said program other than said program displayed on said nonselected screen portion if said programs are identical to each other when said nonselected screen portion displays said program of digital television broadcasting and said program subsequently displayed on said selected screen portion is said program of digital television broadcasting.

5. The display according to claim 4, wherein said control portion is so formed as to compare said picture identifier of said program currently displayed on said nonselected screen portion and said picture identifier of said program subsequently displayed on said selected screen portion with each other if said program identifiers are invalid.

6. A method of controlling a display in which the user selects either a first display screen portion of a display portion or a second display screen portion provided to be capable of displaying a program thereon independently of said first display screen portion as a selected screen portion and switches a program of digital television broadcasting, comprising the steps of:

determining whether or not a program subsequently displayed on said selected screen portion and a program displayed on a nonselected screen portion corresponding to the nonselected one of said first and second display screen portions are identical to each other, wherein the step of determining whether or not said programs are identical to each other includes steps of:

acquiring said program identification information related to said program of digital television broadcasting currently displayed on said nonselected screen portion and said program identification information related to said program of digital television broadcasting subsequently displayed on said selected screen portion from a channel map including said program identification information and comparing the same with each other, and updating said channel map every time the user switches said program on the basis of said program identification information related to said program of digital television broadcasting subsequently displayed on said selected screen portion, wherein said display includes a receiving portion receiving a picture of said program of digital television broadcasting distributed by a broadcasting station and displayed on said display portion, and the step of determining whether or not said programs are identical to each other further includes a step of comparing said program identification information received by said receiving portion from said broadcasting station along with picture information of said program, wherein said program identification information includes channel numbers corresponding to a program of said digital television broadcasting distributed by said broadcasting station and received by said receiving portion, and the step of determining whether or not said programs are identical to each other further includes a step of comparing said channel number of said program currently displayed on said nonselected screen portion and said channel number of said program subsequently displayed on said selected screen portion with each other, wherein each said channel number has a virtual channel number corresponding to a plurality of programs and a subchannel number corresponding to any one of said plurality of programs corresponding to said virtual channel number, and the step of determining whether or not said programs are identical to each other further includes a step of comparing said virtual channel number and said subchannel number of said program currently displayed on said nonselected screen portion and said virtual channel number and said subchannel number of said program subsequently displayed on said selected screen portion with each other.

7. The method of controlling a display according to claim 6, wherein the step of displaying said program other than said program displayed on said nonselected screen portion on said selected screen portion includes a step of displaying a program of a channel number subsequent to said channel number of said program displayed on said nonselected screen portion on said selected screen portion if programs displayed on said selected screen portion are successively switched in the order of said channel numbers and said program subsequently displayed on said selected screen portion and said program displayed on said nonselected screen portion are identical to each other.

8. The method of controlling a display according to claim 6, wherein said program identification information includes a program identifier and a picture identifier corresponding to said program of digital television broadcasting, and the step of determining whether or not said programs are identical to each other further includes a step of comparing at least either said program identifier or said picture identifier of said program currently displayed on said nonselected screen portion and at least either said program identifier or said picture identifier of said program subsequently displayed on said selected screen portion with each other if said nonselected screen portion displays said program of digital television broadcasting and said program subsequently displayed on said selected screen portion is said program of digital television broadcasting.

9. A display comprising:

a display portion including a first display screen portion capable of switching a program displayed thereon by an operation of the user and a second display screen portion provided to be capable of displaying a program thereon independently of said first display screen portion and capable of switching a program of digital television broadcasting displayed thereon by an operation of the user;

a control portion determining whether or not said program subsequently displayed on said selected screen portion and said program currently displayed on said nonselected screen portion are identical to each other by comparing program identification information related to said program currently displayed on said nonselected screen portion and program identification information related to said program subsequently displayed on said selected screen portion with each other, and controlling said selected screen portion to display a program other than a program displayed on a nonselected screen portion corresponding to the nonselected one of said first and second display screen portions if a program subsequently displayed on said selected screen portion and said program displayed on said nonselected screen portion are identical to each other, when the user performs an operation of selecting either said first display screen portion or said second display screen portion as a selected screen portion and switching a program;

wherein said control portion is so formed as to acquire said program identification information related to said program of digital television broadcasting currently displayed on said nonselected screen portion and said program identification information related to said program of digital television broadcasting subsequently displayed on said selected screen portion from a channel map including said program identification information and to compare the same with each other and to update said channel map every time said operation is performed by the user on the basis of said program identification information related to said program of digital television broadcasting subsequently displayed on said selected screen portion, when the user performs said operation of switching said program displayed on said selected screen portion;

said program identification information includes a program identifier and a picture identifier corresponding to said program of digital television broadcasting;

said control portion is so formed as to determine whether or not said program subsequently displayed on said selected screen portion and said program currently displayed on said nonselected screen portion are identical to each other by comparing at least either said program identifier or said picture identifier of said program currently displayed on said nonselected screen portion and at least either said program identifier or said picture identifier of said program subsequently displayed on said selected screen portion with each other and to control said selected screen portion to display said program other than said program displayed on said nonselected screen portion if said programs are identical to each other when said nonselected screen portion displays said program of digital television broadcasting and said program subsequently displayed on said selected screen portion is said program of digital television broadcasting; and said control portion is so formed as to compare said picture identifier of said program currently displayed on said nonselected screen portion and said picture identifier of said program subsequently displayed on said selected screen portion with each other if said program identifiers are invalid.

\* \* \* \* \*